US007828006B2

(12) United States Patent
Bai

(10) Patent No.: US 7,828,006 B2
(45) Date of Patent: Nov. 9, 2010

(54) SAFETY FLOW GUIDE PROTECTION DEVICE

(76) Inventor: Yi-Jhih Bai, 235 Chung-Ho Box 8-24, Taipei (TW)

( * ) Notice: Subject to any disclaimer, the term of this patent is extended or adjusted under 35 U.S.C. 154(b) by 314 days.

(21) Appl. No.: 11/946,054

(22) Filed: Nov. 28, 2007

(65) Prior Publication Data

US 2008/0142092 A1 Jun. 19, 2008

(30) Foreign Application Priority Data

Dec. 13, 2006 (TW) .............................. 95221973 U

(51) Int. Cl.
*F16K 17/40* (2006.01)

(52) U.S. Cl. ................................. 137/68.12; 137/68.14

(58) Field of Classification Search .............. 137/68.11, 137/68.12, 68.14, 68.27, 72, 70, 74; 210/222
See application file for complete search history.

(56) References Cited

U.S. PATENT DOCUMENTS

| | | | | |
|---|---|---|---|---|
| 1,411,483 | A * | 4/1922 | Floyd | 137/68.14 |
| 2,048,388 | A * | 7/1936 | Johnsen | 137/68.12 |
| 2,898,926 | A * | 8/1959 | Tsiguloff | 137/68.14 |
| 2,910,080 | A * | 10/1959 | Wright et al. | 137/39 |
| 2,914,178 | A * | 11/1959 | Edelen | 210/222 |
| 2,945,503 | A * | 7/1960 | Atkinson | 137/68.14 |
| 2,962,035 | A * | 11/1960 | Wright et al. | 137/39 |
| 3,645,286 | A * | 2/1972 | Follett | 137/68.14 |
| 3,862,641 | A * | 1/1975 | Follett | 137/75 |
| 3,916,929 | A * | 11/1975 | Brown | 137/68.14 |
| 4,077,422 | A * | 3/1978 | Brinkley et al. | 137/68.14 |
| 4,196,636 | A * | 4/1980 | Beazley | 74/2 |
| 4,921,000 | A * | 5/1990 | King et al. | 137/68.14 |
| 5,144,973 | A * | 9/1992 | Green et al. | 137/71 |
| 5,289,842 | A * | 3/1994 | Bravo | 137/68.11 |
| 5,542,445 | A * | 8/1996 | Adams | 137/68.12 |
| 5,758,682 | A * | 6/1998 | Cain | 137/68.14 |
| 5,857,698 | A * | 1/1999 | Fuerst et al. | 280/737 |
| 5,941,268 | A * | 8/1999 | Ross, Jr. | 137/68.14 |
| 6,802,332 | B1 * | 10/2004 | Stuart | 137/68.12 |
| 6,895,952 | B1 * | 5/2005 | Bachelder | 126/25 R |
| 7,578,308 | B2 * | 8/2009 | Lauber et al. | 137/68.14 |
| 2002/0005066 | A1 * | 1/2002 | Tanner et al. | 73/146 |

* cited by examiner

*Primary Examiner*—John Rivell
*Assistant Examiner*—Macade Brown

(57) ABSTRACT

A safety flow guide protection device comprises a body having a flow guide device through which high pressure air flows; the flow guide device coated with a protecting layer; a safety releasing section formed at a surface of the flow guide device, the flow guide device being a hollow structure; a rear side of the flow guide device being formed as a combining opening; an air grid unit being received in the flow guide device at a side opposite to the combining opening; the air grid unit having a brake air valve for controlling high pressure air. When the flow guide device is communicated, the brake air valve is not compressed by the high pressure air so that the air grid unit is opened for allowing the flowing of the high pressure air; and vice versa.

6 Claims, 11 Drawing Sheets

SAFETY FLOW GUIDE PROTECTION DEVICE

FIELD OF THE INVENTION

The present invention relates to storage of gases, and particularly to a safety flow guide protection device, wherein when a greater external force or in high temperature environment, the air tube will isolate so as to provide a protection to the high pressure container.

BACKGROUND OF THE INVENTION

Various gases, such as oxygen, natural gas, dioxide carbon, liquid petroleum, etc., are widely used in industry, medicine, home, etc. Other than transferring through pipes, most of gases are stored in a high pressure containers (such as aluminum containers, steel containers, etc.). Currently, high pressure container has a body with a releasing switch. The releasing switch is installed with a gas tube or an adjusting valve so as to transfer gas to a desired place.

Because high pressure container contains high pressure air or the gas has bad effects to human body, the storage and use of high pressure air are important. Currently, indications are indicated at the outer surface of a high pressure container and the releasing switch is installed with a safety plug for preventing the drainage of the gas. However this only has an advance effect. If the gas tube or the adjusting valve has faults, due to the emergency occurred, the indications and safety plug in the releasing switch can resolve this problem.

Furthermore, some drain proof or explosion proof devices installed to the gas tube or the adjusting valve is actuated by the abnormal variation of the gas in the container, but the drainage of the gas is at a distal end of the gas tube or the drainage of gas is not apparent. As a result, this safety device can not effectively detect the drainage of the gas. Furthermore, some emergencies, such as electric short circuit, fire accident, earthquake, etc., can not be detected by the safety device of the container. As a result, high pressure air still drains out from the gas tube so as to induce a more great accident to people.

SUMMARY OF THE INVENTION

Accordingly, the primary object of the present invention is to provide a safety flow guide protection device, wherein when a greater external force or in high temperature environment, the air tube will isolate so as to provide a protection to the high pressure container.

To achieve above objects, the present invention provides a safety flow guide protection device, comprising: a body having a flow guide device through which high pressure air flows; the flow guide device coated with a protecting layer; a safety releasing section formed at a surface of the flow guide device, the flow guide device being a hollow structure; a rear side of the flow guide device being formed as a combining opening; an air grid unit being received in the flow guide device at a side opposite to the combining opening; the air grid unit having a brake air valve for controlling high pressure air; wherein when the flow guide device is communicated, the brake air valve is not compressed by the high pressure air so that the air grid unit is opened for allowing the flowing of the high pressure air; when the flow guide device is not communicated, the brake air valve is compressed by high pressure air so that the air grid unit will isolate the high pressure air; when a greater external force is applied to the protection layer or in high temperature, the flow guide device will separate from the combining unit so as to prevent drainage, burning and explosion of high pressure air.

Furthermore, the present invention provides a safety flow guide protection device, comprising: a flow guide device installed with a flow guide unit and a combining unit; the combining unit having a combining opening; an air grid unit having a plug, a channel and a brake air valve; a protection unit enclosing surfaces of the flow guide unit and the combining unit; the protection unit being made of meltable material; wherein in accident, the protection unit can not be destroyed at a first time, the protection unit will break gradually due to high temperature so that the flow guide device returns to the un-communication state; the brake air valve is compressed by the high pressure air in the gas cylinder so that the air grid unit will be in the seal condition for isolating the high pressure air so as to prevent the high pressure air to drain out, to burn or explosion.

The various objects and advantages of the present invention will be more readily understood from the following detailed description when read in conjunction with the appended drawing.

DETAILED DESCRIPTION OF THE PREFERRED EMBODIMENTS

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
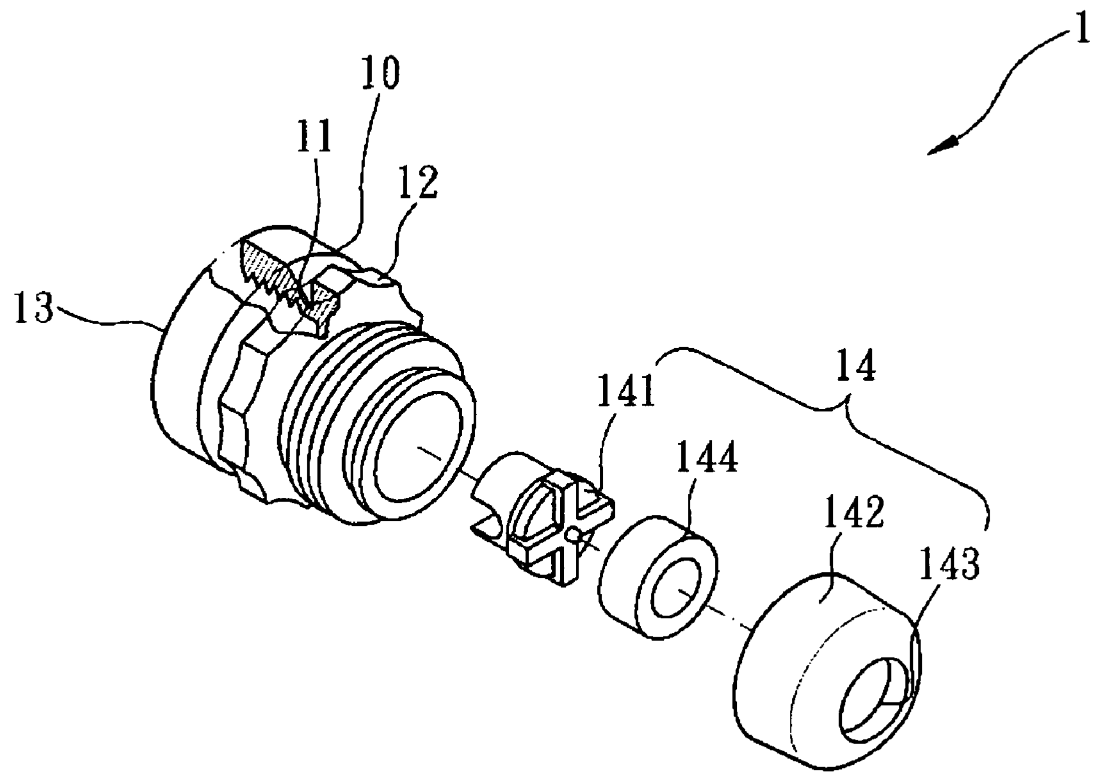
FIG. 1 is an exploded perspective view of the safety flow guide protection device of the present invention.
Figure 2:
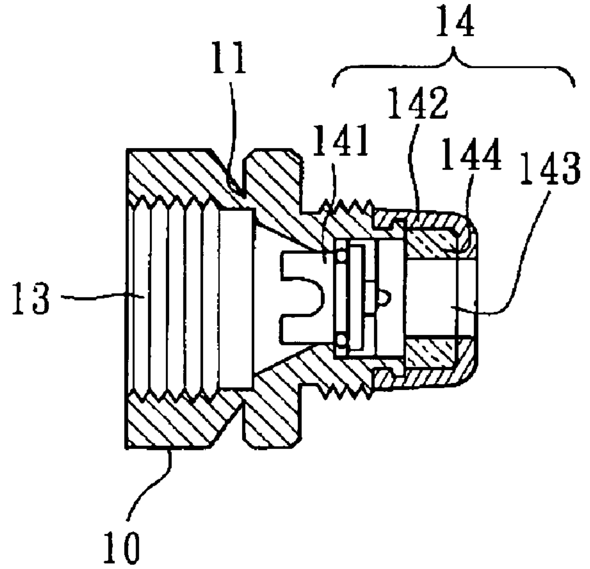
FIG. 2 is a schematic cross sectional view of the present invention.

The present invention relates to a safety flow guide protection device, as those illustrated in FIGS. 1 and 2. A body 1 has a flow guide device 10 through which high pressure air flows.

The flow guide device 10 is coated with fluorescent powders and light emitting materials (especially at night) so that the flow guide device 10 can emit light at night.

A safety releasing section 11 is annularly formed on an outer periphery of the flow guide device 10. In this embodiment, the safety releasing section 11 has a V shape which is indented into the outer periphery of the flow guide device 10, so that a cross section area of the safety releasing section 11 is smaller than other area of the flow guide device 10. A polygonal flange 12 is annularly formed on the outer periphery of the flow guide device 10 and near the safety releasing section 11. Each side of the flange 12 is formed as a concave cambered side. The flow guide device 10 is a hollow structure. A rear side of the flow guide device 10 is formed as a combining opening 13.

An air grid unit 14 has a brake air valve 141 which is movably received in a front side of the flow guide device 10 opposite to the combining opening 13 for selectively sealing the flow guide device 10. The brake air valve 141 is provided for controlling high pressure air. A plug 142 covers the front side of the brake air valve 141 for retaining the brake air valve 141 in the flow guide device 10. The plug 142 has a channel 143 axially defined therein, such that high pressure air is able to flow through the channel 143. High pressure air flows through the channel 143. A magnetic attracting unit 144 is coaxially installed between the plug 142 and the brake air valve 141 for adsorbing iron dregs and other impurities from high pressure air. The magnetic attracting unit 144 is ring-shaped and has two ends which respectively abut against the plug 142 and the flow guide device 10.

Referring to FIGS. 3 to 6 of the present invention, the assembly and effect of the present invention are illustrated. In this embodiment, a high pressure container is used as an example for description.

Figure 3:
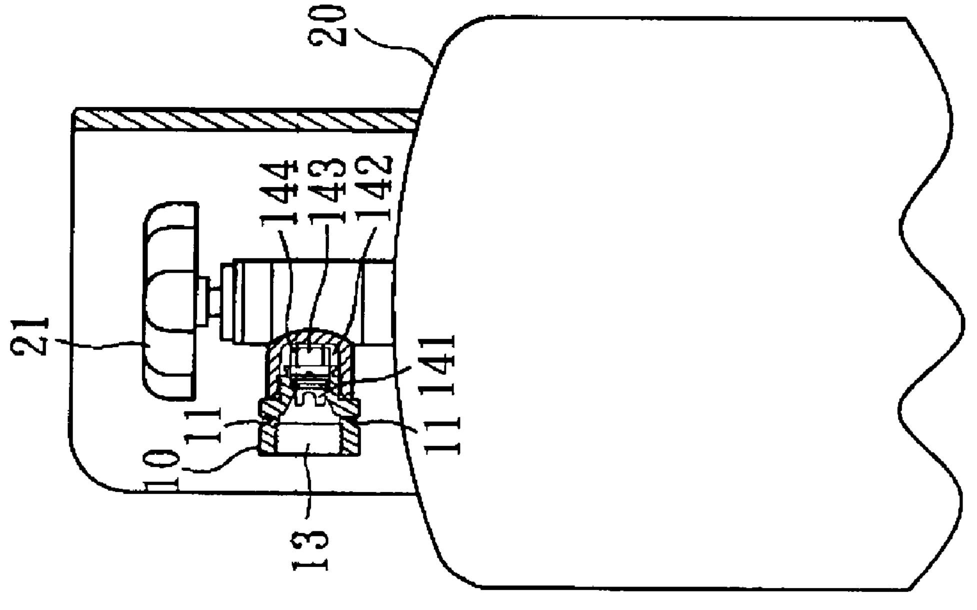
FIG. 3 is a schematic view showing the assembly of the high pressure air container according to the present invention.

In FIG. 3, the high pressure container is a gas cylinder 20 (but it will not confine the scope of the present invention). In assembly, the plug 142 is aligned to the opening of a releasing switch 21. A tool is engaged to the polygonal flange 12 to operate the body 1 so as to be installed to the releasing switch 21 of the gas cylinder 20.

Figure 4:
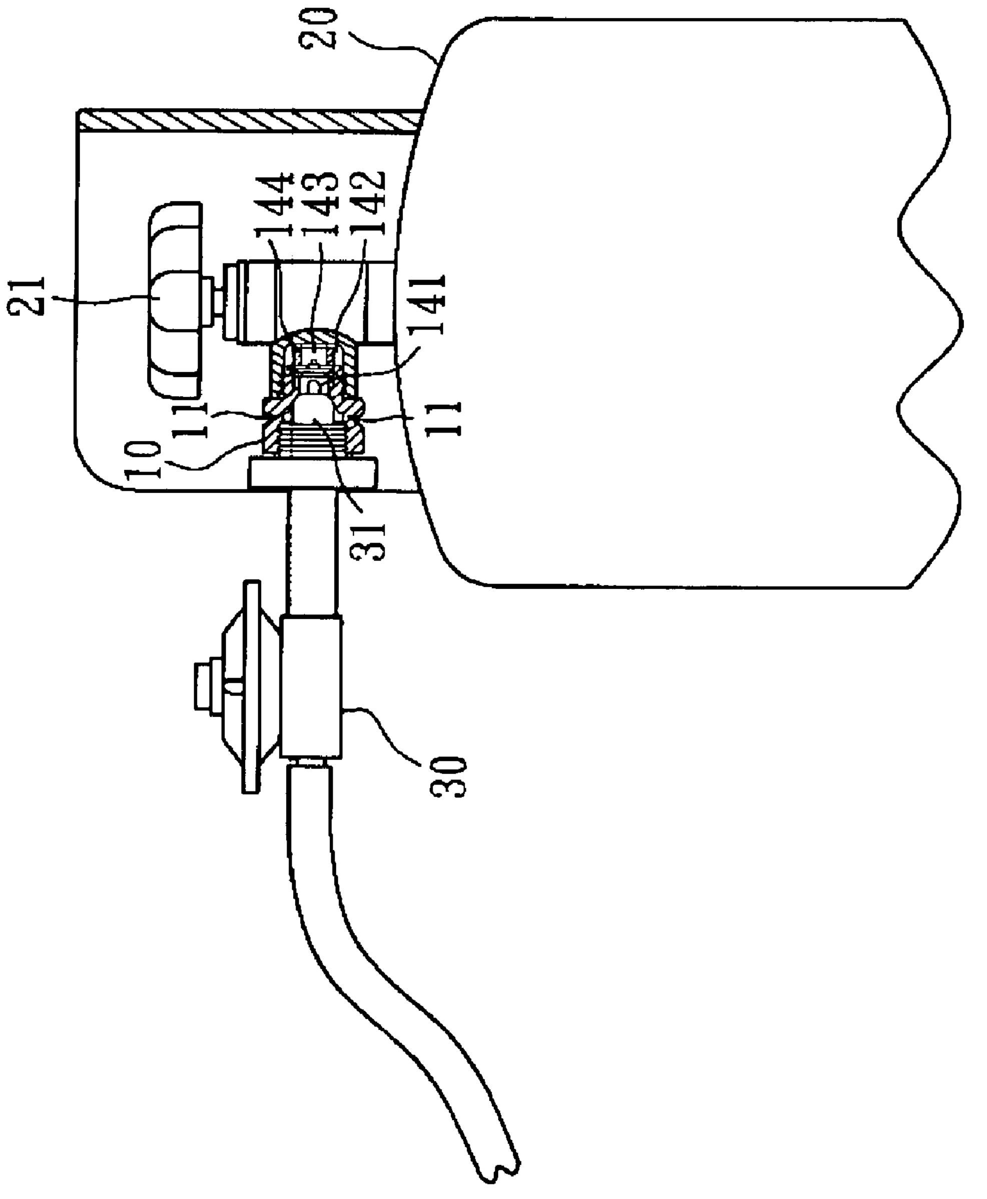
FIG. 4 is a schematic view showing the assembly of the present invention with an air tube.

Referring to FIG. 4, a joint 31 of an air tube 30 for outputting high pressure air is installed into the combining opening 13 of the flow guide device 10 so that the air grid unit 14 is communicated to the air tube 30. Thus, the high pressure air in the gas cylinder 20 can be released along the path of the flow guide device 10 and the air tube 30 with the actuation of the releasing switch 21. If the releasing switch 21 is actuated, the brake air valve 141 is pushed by the joint 31 to move toward the channel 143 so that the flow guide device 10 is unsealed and opened. Thus, the brake air valve 141 is not confined by the airflow of the high pressure air and the air grid unit 14 is opened for flowing through the high pressure air. On the contrary, when the flow guide device 10 is not connected to the air tube 30 or the brake air valve 141 is not pushed by the joint 31. The brake air valve 141 is pressed by the high pressure air in the gas cylinder 20 to move toward the joint 31 so that the channel 143 is isolated from the joint 31. The flow guide device 10 is sealed by the brake air valve 141 for isolating the high pressure air.

Figure 5:
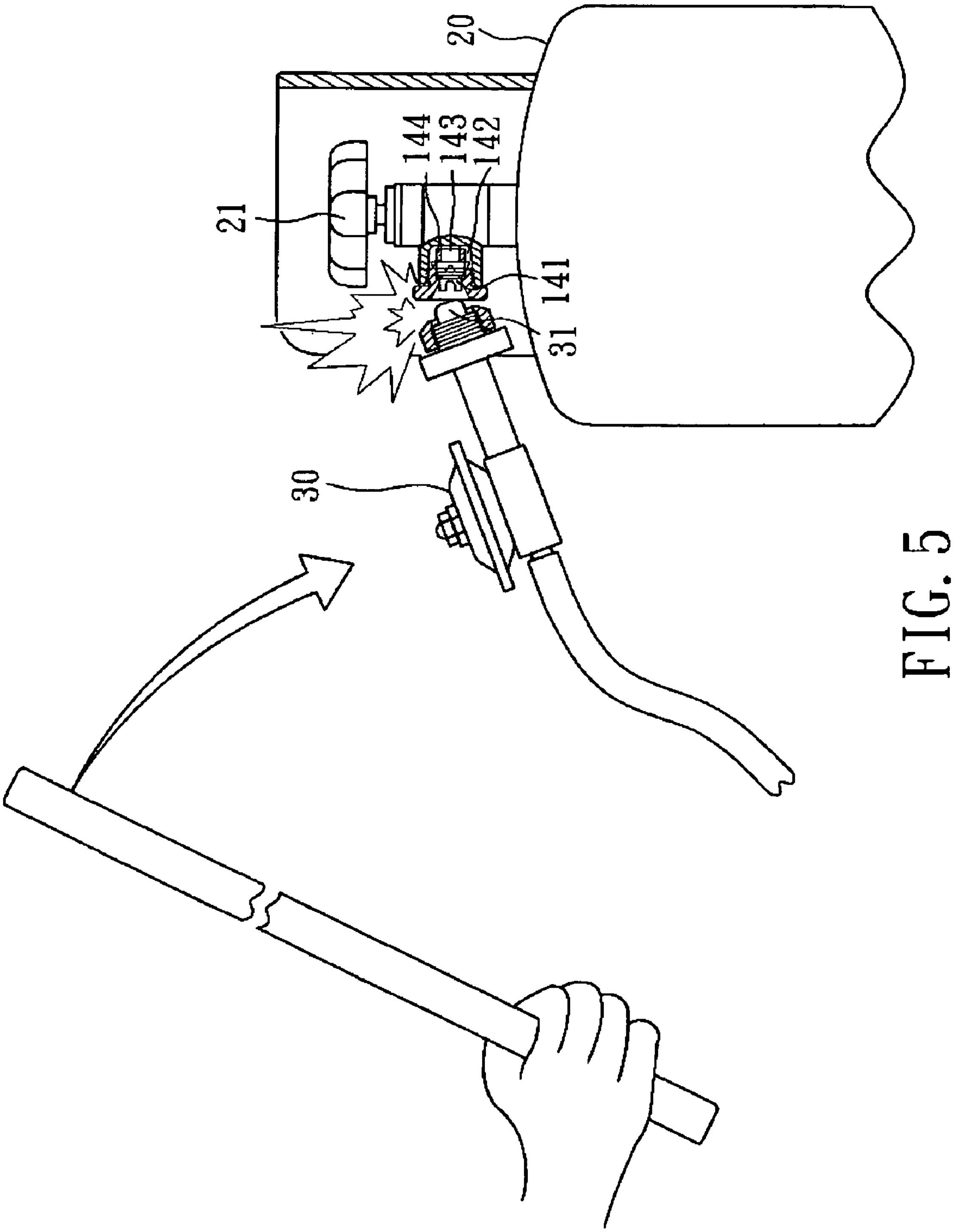
FIGS. 5 and 6 are schematic views showing the operation in emergency according to the present invention.
Figure 6:
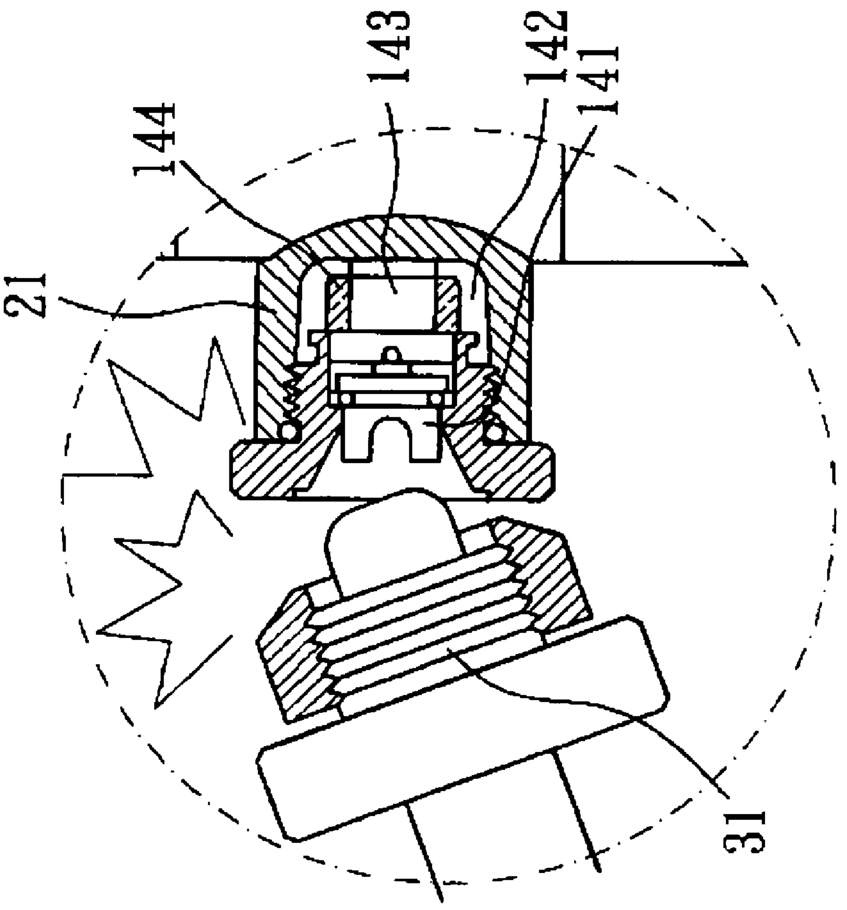
Figure 7:
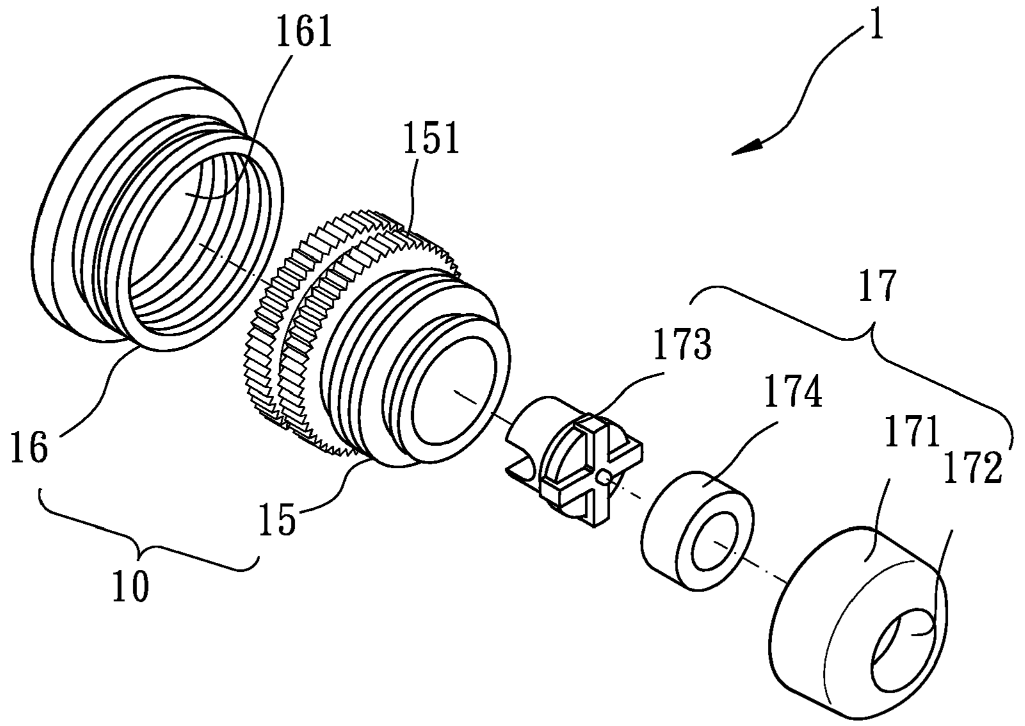
FIG. 7 is an exploded perspective view of the first embodiment of the present invention.
Figure 8:
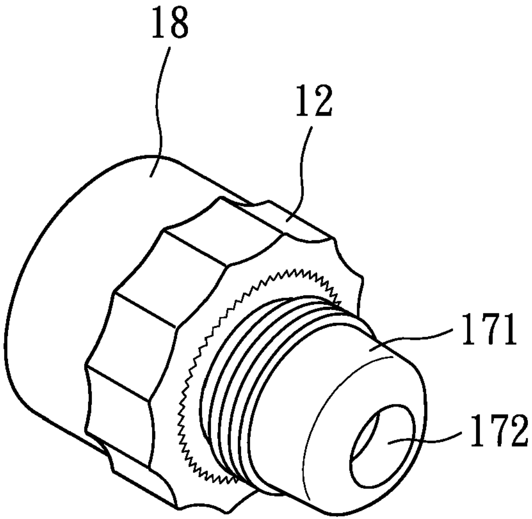
FIG. 8 is a perspective view about the outlook of the second embodiment of the present invention.
Figure 9:
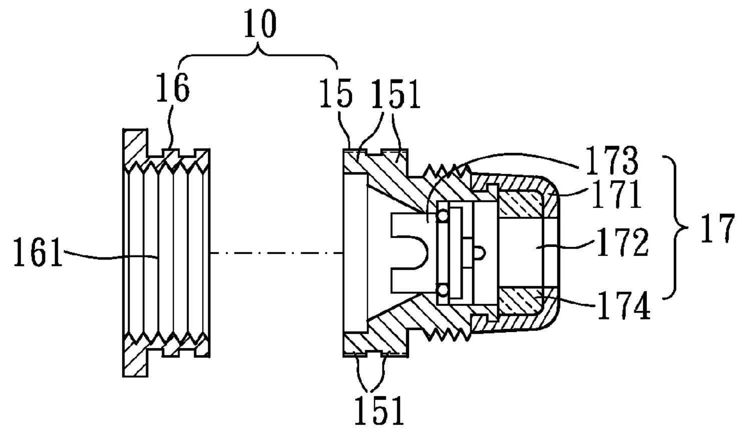
FIGS. 9 to 11 are schematic views showing the formation of the second embodiment of the present invention.
Figure 10:
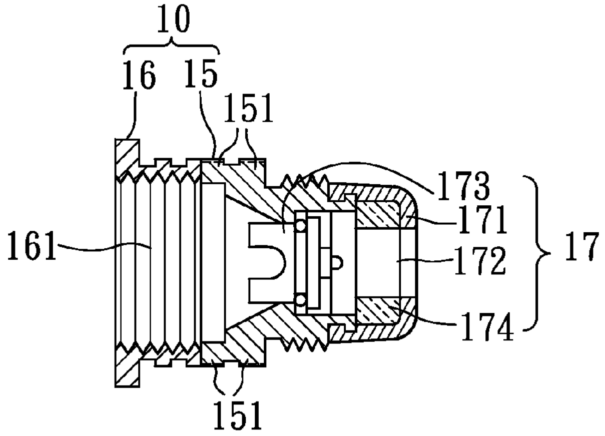
Figure 11:
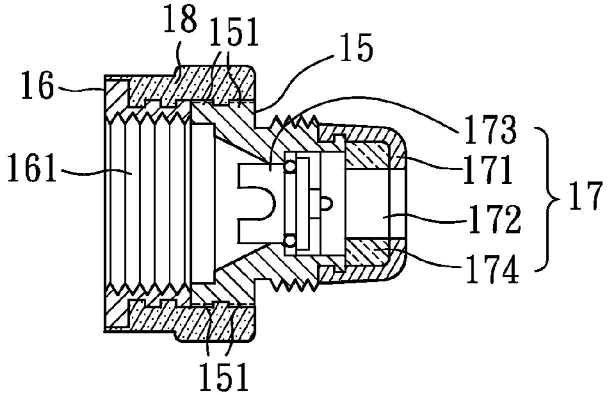

Referring to FIGS. 5 and 6, when the environment having the high pressure air container has accidents, such as fire accidents, abnormal weather, electric short circuit, etc. For avoiding dangerous conditions, the air tube 30 must be separated from the high pressure air container. It is only necessary to beat the air tube 30 by a long rod, or throwing a stone. The air tube 30 is impacted to apply a stress to the flow guide device 10. Since the safety releasing section 11 of the flow guide device 10 has a smaller cross-sectional area and is thinner than other area of the flow guide device 10, it can not suffer from a transient stress so that the flow guide device 10 firstly splits at and breaks from the safety releasing section 11. Or when some accidents, such as wind accident, earthquake, etc., the air tube 30 is impacted. The flow guide device 10 breaks from the safety releasing section 11 so that it is not a communicated state. The brake air valve 141 is pushed by the high pressure air in the gas cylinder 20. The flow guide device 10 is sealed by the brake air valve 141 for isolating high pressure air from draining out to hurt other people or to explode.

Referring to FIGS. 7 to 16, a second embodiment of the present invention is illustrated. In this embodiment, those identical to the above embodiment will not be further described herein. Only those differences from above embodiment are described.

Referring to FIGS. 7 to 11, the flow guide device 10 is installed with a flow guide unit 15 and a combining unit 16 which rest against the flow guide unit 15. The combining unit 16 has a combining opening 161 defined in one end thereof. The flow guide unit 15 has a plurality of ratchet tooth 151 annularly formed on an outer periphery thereof.

An air grid unit 17 has a plug 171 and a brake air valve 173. The brake air valve 173 is received in one end of the flow guide unit 15 which is opposite to the combining unit 16 for selectively sealing the flow guide unit 15. The plug 171 covers the flow guide unit 15 for retaining the brake air valve 173 in the flow guide unit 15. The plug 171 has a channel 172 axially defined therein, such that high pressure air is able to flow through the channel 172. A magnetic attracting unit 174 is coaxially installed between the plug 171 and the brake air valve 173 for adsorbing iron dregs and other impurities from high pressure air. The magnetic attracting unit 174 is ring-shaped and has two ends which respectively abut against the plug 171 and the flow guide unit 15.

A protection unit 18 encloses the outer periphery of the flow guide unit 15 and an outer periphery of the combining unit 16. The protection unit 18 is made of meltable material. The protection unit 18 may have a polygonal stepped shape. A maximum thickness of the protection unit 18 is between 1 mm and 6 mm. This thickness is suitable for a normal stress in installation and detaching. In emergency, the protection unit 18 can be destroyed easily.

Figure 12:
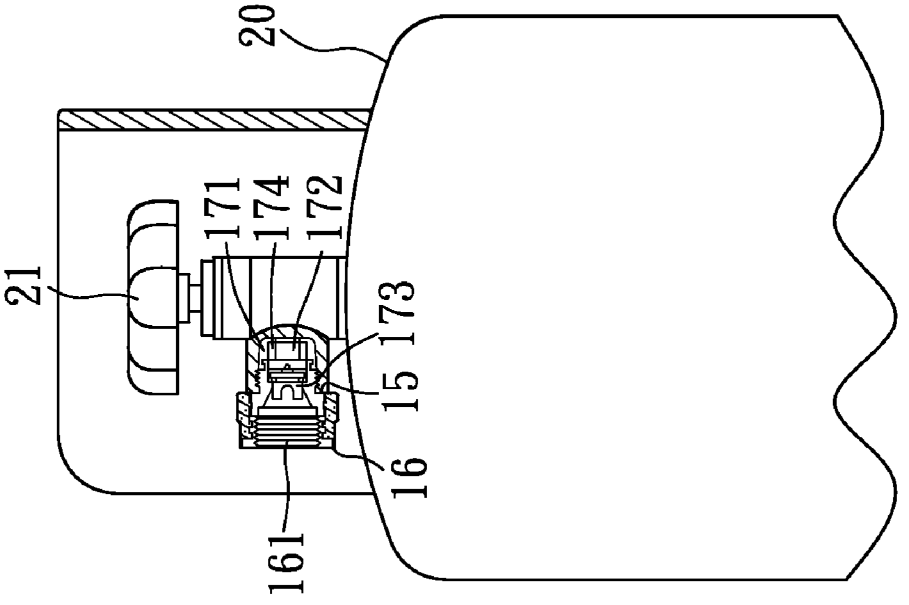
FIG. 12 is a schematic view showing assembly of the high pressure air container in the second embodiment of the present invention.
Figure 14:
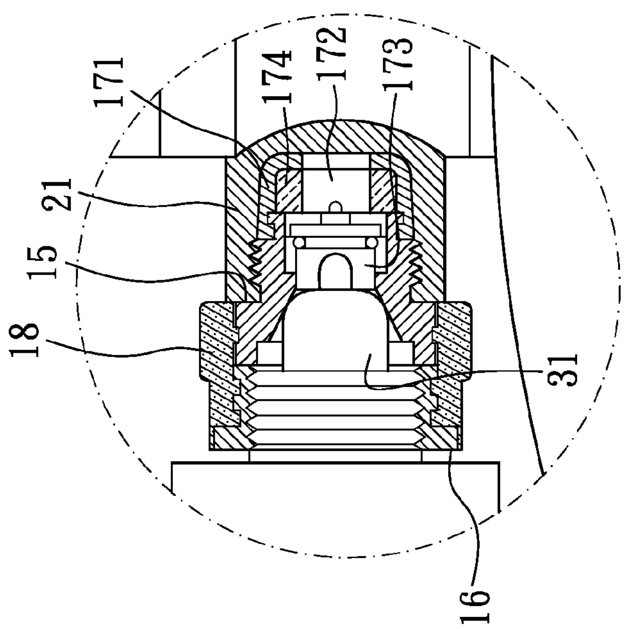
FIGS. 13 and 14 are schematic views showing the assembly of the second embodiment of the present invention with an air tube.
Figure 13:
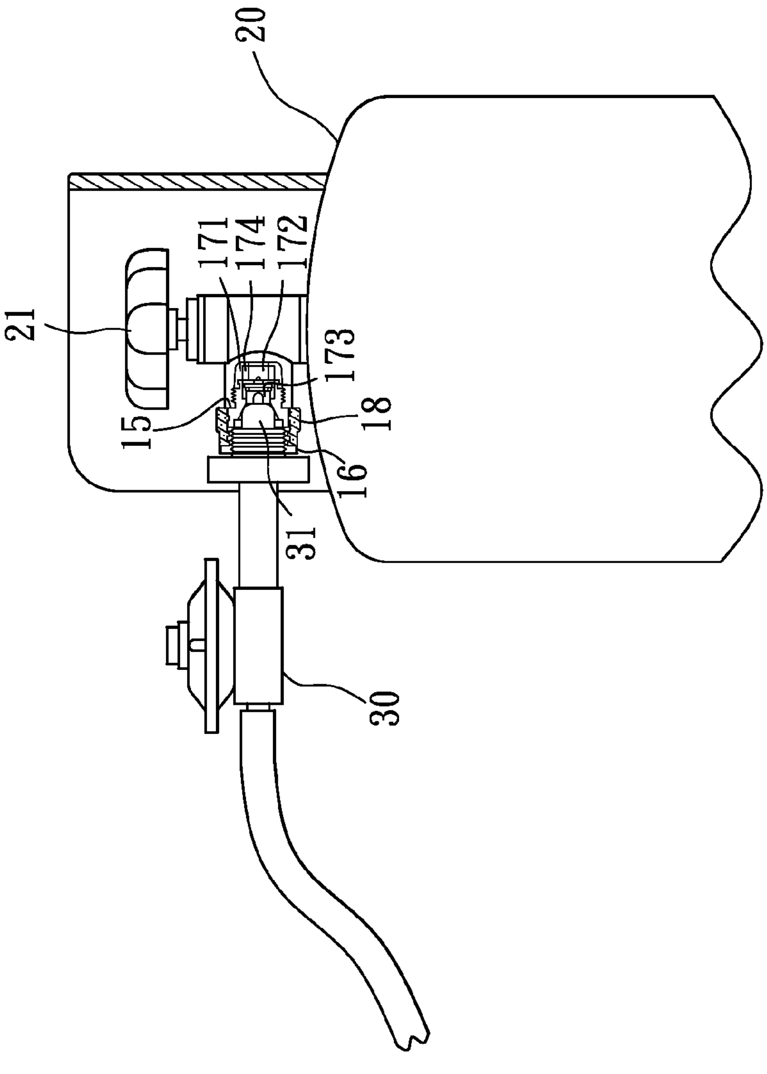

Referring to FIGS. 12 to 14, the installation of the second embodiment of the present invention is illustrated. The installation of the second embodiment is identical to that in the first embodiment. In emergency, the stress of beating and impacting the air tube will break the protection unit 18 so that the flow guide unit 15 is separated from the combining unit 16.

Figure 16:
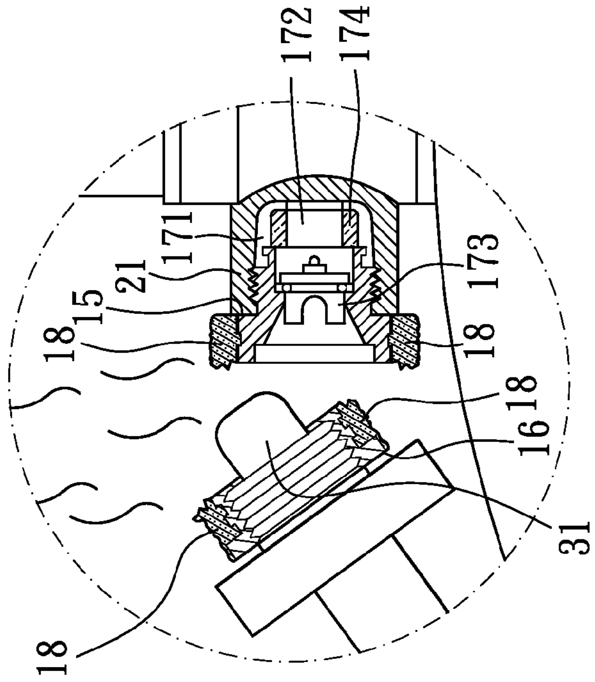
FIGS. 15 and 16 are schematic views showing the operation of the second embodiment in emergency.
Figure 15:
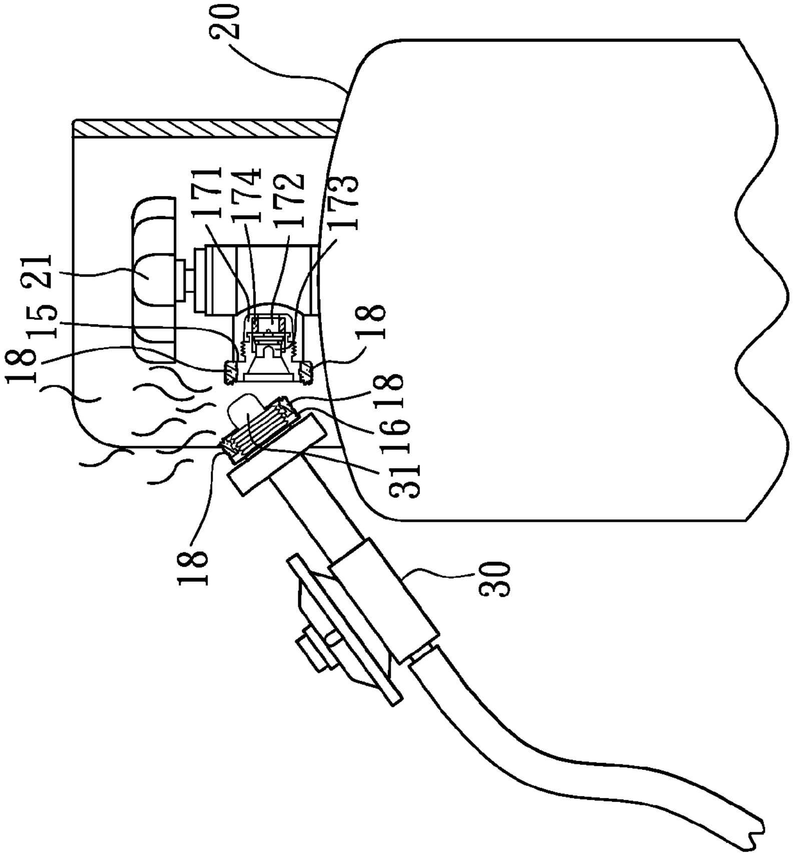

Referring to FIGS. 15 and 16, even in fire accident, earthquake, or some accidents, the protection unit 18 can not be destroyed immediately, and the protection unit 18 will be melted and break gradually due to high temperature so that the flow guide device 10 returns to the un-communication state. The brake air valve 173 is compressed by the high pressure air in the gas cylinder 20 so that the flow guide device 10 will be sealed by the brake air valve 173 for isolating the high pressure air so as to prevent the high pressure air to drain out, to burn or explosion.

Figure 17:
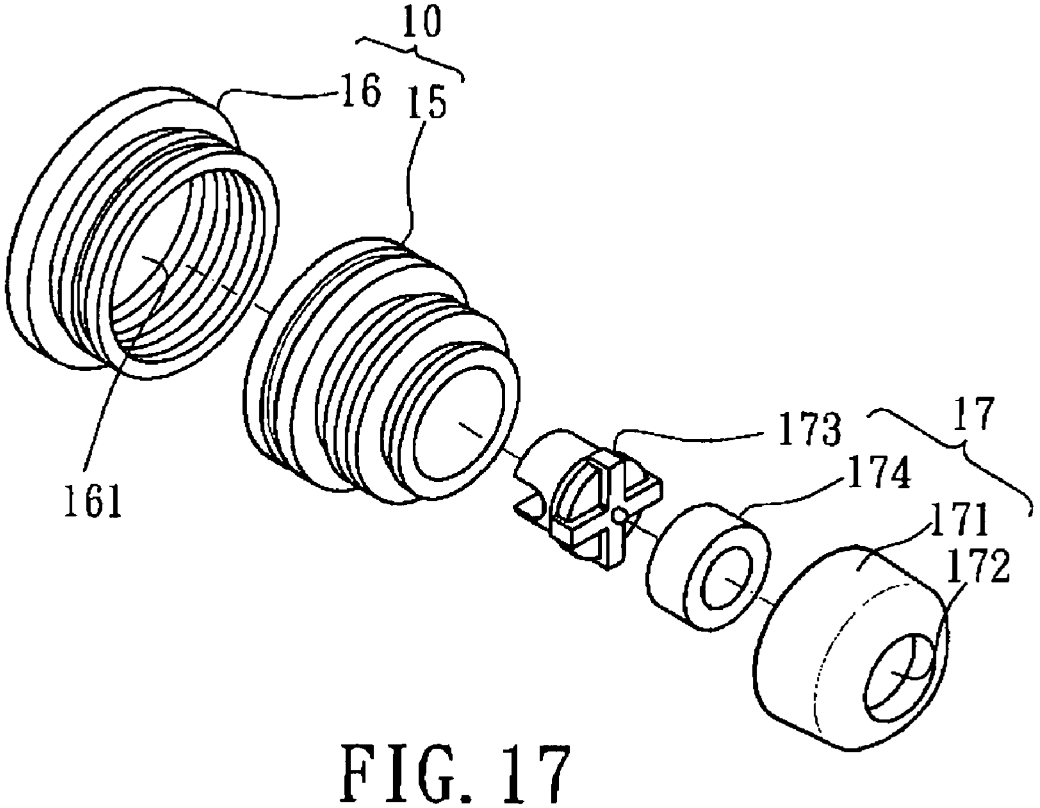
FIGS. 17 and 18 are an exploded perspective view and a schematic cross sectional view about one application of the second embodiment of the present invention.
Figure 18:
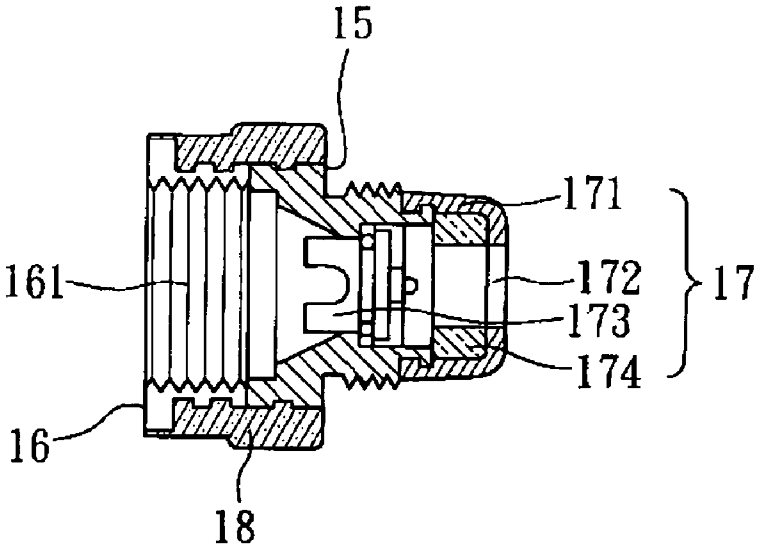

As shown in FIGS. 17, and 18, the ratchet teeth 151 of the flow guide unit 15 is removed so that the flow guide device 10 is rotatable with respect to the protection unit 18 to prevent other people to remove the flow guide device 10 as desired.

The Advantages of the present invention are that the external force can destroy the safety releasing section 11 and the protection unit 18 so as to prevent the drainage of high pressure air. Furthermore, the flow guide device 10 and protection unit 18 are coated with light emitting material so that they can be identified easily. The magnetic attracting units 144, 174 can absorb iron dregs and other impurities so that high pressure air can be released easily and successfully.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A safety flow guide protection device, comprising:

a body having a flow guide device for passing pressure air flows; the flow guide device having a flow guide unit and a combining unit resting against the flow guide unit; the combining unit having a combining opening defined in one end thereof; a protection unit enclosing an outer periphery of the flow guide unit and the combining unit, the protection unit made of meltable material;

an air grid unit being disposed in one end of the flow guide unit opposite to the combining unit; the air grid unit having a brake air valve received in the flow guide unit for selectively sealing the flow guide unit and controlling high pressure air, the air grid unit having a plug covering the end of the flow guide unit for retaining the brake air valve in the flow guide unit, the plug having a channel axially defined therein, such that high pressure air flows through the channel;

wherein when the flow guide device is communicated, the brake air valve is not compressed by the high pressure air, so that the brake air valve unseals the flow guide unit and the air grid unit is opened for allowing the flowing of the high pressure air; when the flow guide device is not communicated, the brake air valve is compressed to seal the flow guide unit by high pressure air, so that the air grid unit will isolate the high pressure air; when a greater external force is applied, the protection unit will break; when the surrounding temperature is high, the protection unit will be gradually melted, the flow guide unit separating from the combining unit, the brake air valve pushed to seal the flow guide unit by high pressure air so as to prevent from drainage, burning and explosion of high pressure air.

2. The safety flow guide protection device as claimed in claim 1, wherein the air grid unit has a magnetic attracting unit installed between the plug and the brake air valve for adapting to adsorb iron dregs and other impurities from high pressure air.

3. The safety flow guide protection device as claimed in claim 1, wherein the protection unit has a polygonal stepped shape.

4. The safety flow guide protection device as claimed in claim 1, wherein the protection unit is a light emitting body.

5. The safety flow guide protection device as claimed in claim 1, wherein a thickness of the protection unit is between 1 mm to 6 mm.

6. The safety flow guide protection device as claimed in claim 1, wherein the flow guide unit is annularly formed with a plurality of teeth.

* * * * *